United States Patent [19]

Åsberg

[11] 4,225,263
[45] Sep. 30, 1980

[54] LOCKING DEVICE
[75] Inventor: Sture L. Åsberg, Partille, Sweden
[73] Assignee: SKF Nova AB, Gothenburg, Sweden
[21] Appl. No.: 878,156
[22] Filed: Feb. 15, 1978
[30] Foreign Application Priority Data
Mar. 31, 1977 [SE] Sweden ............................. 7703727
[51] Int. Cl.² ............................................. F16D 1/06
[52] U.S. Cl. ................................. 403/326; 403/355
[58] Field of Search .............. 403/326, 259, 261, 359, 403/355, DIG. 7, 372; 285/DIG. 19

[56] References Cited
U.S. PATENT DOCUMENTS

| 1,391,012 | 9/1921 | Schulder | 403/359 |
|---|---|---|---|
| 2,453,391 | 11/1948 | Whittingham | 285/DIG. 19 |
| 2,611,632 | 9/1952 | Harris | 403/359 X |
| 2,775,037 | 7/1956 | Sarah | 403/355 X |
| 3,374,015 | 3/1968 | Gies | 403/359 |
| 4,077,232 | 3/1978 | Grosseau | 403/326 |

FOREIGN PATENT DOCUMENTS

1118012  11/1961  Fed. Rep. of Germany ........... 416/244

*Primary Examiner*—Andrew V. Kundrat
*Attorney, Agent, or Firm*—Eugene E. Renz, Jr.

[57] ABSTRACT

Device for locking a male element such as a shaft engaging in the bore of a female element such as a wheel hub against axial displacement. An annular groove is provided in the bore of the female member and has a first annular surface engageable by an elastically deformable locking ring mounted on a reduced section of the shaft member. A displaceable member such as a nut is moveable relative to the shaft member and has a second surface engageable with the locking ring. At least one of the surfaces is tapered so that upon movement of the surfaces toward one another, the locking ring is displaced radially outwardly to engage in the groove and lock the elements together.

7 Claims, 3 Drawing Figures

LOCKING DEVICE

BACKGROUND OF THE INVENTION

The present application refers to a device for locking an element against axial displacement in a bore in another element, of the type defined in the preamble of the accompanying claim 1.

When connecting e.g. a drive shaft and an element driven by the motions of the shaft by inserting the shaft in a bore in the element the connection frequently is such that it can transfer torque but has no ability to take up axial forces. This is the case if the connection consists of splines. Special arrangements are then necessary for locking the two elements axially.

The most common arrangement is probably that the shaft is provided with a fixed stop face against which the other element is pressed by means of a nut fitted on a threaded portion of the shaft. It is hereby a drawback that the shaft can be fitted in the bore of the other element only from one direction due to the fixed stop face, which will limit the use of the device. As only one side of the other element generally is accessible it is necessary to provide the nut on this side in order to make possible locking and release of the joint. The shaft however thereby must be dismounted towards the side of the other element which is difficult to access, which is a drawback. In order to make possible a dismounting of the shaft towards the side of the other element at which the nut is located it is not possible to use any fixed stop face for the axial locking in one direction, but other types of locking means must be used.

It is earlier known to lock e.g. a bearing ring in a cylindrical bearing seat in a housing by means of a flexible locking ring, which engages a tapering portion adjacent the bearing seat and which can be displaced axially on the tapering portion for being pushed down into a groove in the envelope surface of the bearing ring by means of a number of screws and a thrust washer. Such a device is shown e.g. in Swedish printed specification No. 336,715. With such an arrangement it is possible to locate the bearing in the bearing seat from both directions, but the axial locking will become comparatively complicated as a plurality of elements such as screws must always be tightened or untightened at the locking and the release resp. The locking ring is furthermore located at the side of the seat remote from the screw heads, which means that the dismounting of the joint can be obstructed or made impossible if the locking ring should get jammed in its locking position.

The purpose of the present invention is to provide a locking device of the type specified in the preamble of the specification, by means of which device mounting and dismounting of the one element into the bore of the other can be accomplished by pushing in or pushing out the one element in any direction in and out of the bore of the other element and by means of which device the axial locking during mounting and the release during dismounting is effected in a simple manner and with simple means.

The characteristics of the invention are defined in the accompanying claims.

With a device according to the invention a rapid, reliable and simple mounting and dismounting is made possible as the device comprises only a few parts, which can be easily fitted and handled. The different parts can prior to their mounting and after dismounting be kept together on one of the elements to be locked relative to each other, whereby the handling will be still more simplified. The devices if needed a good protection against penetrating water and dirt, and the design of the two elements to be locked relative to each other can be made with an extensive freedom of design. Due to is simplicity regarding manufacture and handling the device is considered to be competitive to common locking by means of a nut and a co-operating stop face or a groove with a clamping ring.

With a device according to the invention a shaft can be pushed in, pulled out of and locked in a desired position in a bore in another element, even if only one side of this element is accessible.

BRIEF DESCRIPTION OF THE DRAWING

The invention will hereinafter be further described with reference to the accompanying drawing, wherein.

DESCRIPTION OF A PREFERRED EMBODIMENT

Figure 1:
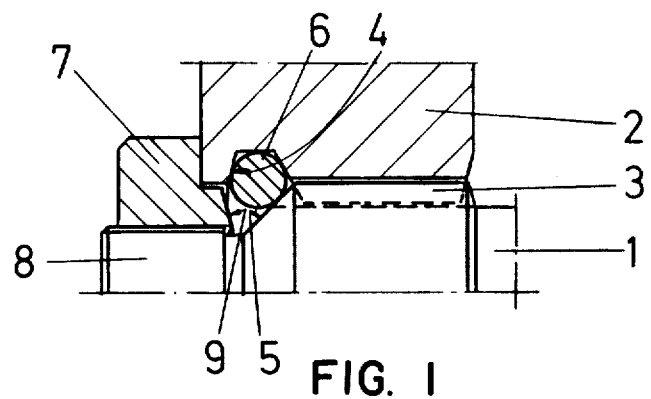
FIGS. 1 and 2 show longitudinal sections through an embodiment of the invention in mounted and dismounted positions, respectively.

In the embodiment shown in FIG. 1 a male 1, which consists of a shaft, and a female element 2, which might be a wheel hub, are connected by means of splines 3 for being able to transfer torque. A groove 4 is provided in the female element 2 and a tapered surface 5 is arranged on the male element 1 between a first section 1a and a second section 8 of reduced cross section. The position of the element 1 in relation to element 2 is when mounted such that the opening of the groove 4 is directed against the tapering surface 5. A locking ring 6 which is elastically deformable so that it will be expanded when it is pressed axially against the tapering surface 5 is arranged to engage against the walls of the groove 4 and against the tapering surface 5. The axial press force is brought about by turning a displaceable member, in the present instance a nut 7, which is arranged on a threaded journal 8 on the element 1 and which is provided with an end surface 9, which extends mainly radially and which contacts the ring 6 when being introduced in the annular slot defined by the bore of the element 2 and the threaded surface of journal 8. This slot must be at least as wide as the thickness of the locking ring in order to make mounting and dismounting possible.

The term "slot" as used herein means the annular space between the inner peripheral surface of the element 2 and the exterior threaded surface of the journal 8 or the radial spacing between the interior peripheral surface of the element 2 and the threads of the journal 8 which is of a greater radial height than the diameter of the locking ring 6.

Figure 2:
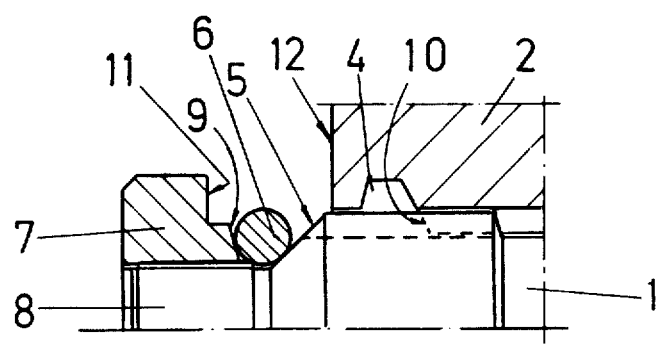

FIG. 2 shows the position of the members forming part of the device shown in FIG. 1 before the locking of the elements 1 and 2 has taken place. Element 1 is thus axially displaceable in the bore of the element 2. The nut 7 and the locking ring 6 are arranged on the journal 8. At the assembly the element 2 is displaced towards the left hand side of the drawing or the element 1 is displaced towards the right hand side until the end surfaces 10 of the splines of the element 2 engages the ring 6. Elements 1 and 2 are thereby positioned in correct mutual positions for the axial locking and the nut 7 is screwed towards the right on the journal 8, whereby the ring 6 is pressed up on the tapering surface 5 so that it is pushed into the groove 4 to the position shown in FIG. 1, whereby elements 1 and 2 are mutually locked in axial direction. In the embodiment shown in FIGS. 1 and 2 the nut 7 is provided with a radially extending surface 11 which at the axial locking will engage a corresponding surface 12 of the element 2. When the surfaces 11 and 12 are in abutting relationship by turning the nut 7 on the threaded journal 8 to the position shown in FIG. 1, the O-ring is engaged in the groove including the left hand side surface thereof when the nut 7 is tightened in the final stages of the mounting operation. A contact between surfaces 11 and 12 will furthermore give a sealing function for the groove 4, the ring 6, the surface 5 and the coupling members 3. It is of course possible to obtain a locking also by allowing the ring to be contacted by the surface 5 and also the surface 9 during the entire assembly operation, whereby the surfaces 11 and 12 however are not brought to mutual contact and which surfaces therefore if desired can be eliminated.

Figure 3:
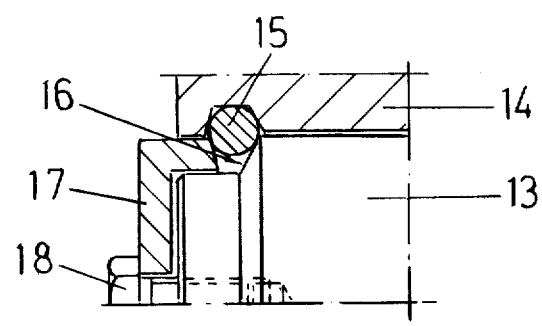
FIG. 3 shows a longitudinal section through another embodiment of the invention in mounted state.

This is the case in the embodiment according to FIG. 3. This figure shows an embodiment of the invention in which an element 13 is axially arrested in a bore in an element 14 thereby that an elastically deformable locking ring 15 has been pushed into a groove in the bore of the element 14. The deformation of the locking ring is brought about thereby that the ring is pressed up on a tapered surface 16 on the element 13 with a washer 17, which can be displaced axially by means of the screw 18, which is arranged in a threaded bore in the end surface of the element 13.

Embodiments of the invention other than those described hereabove are also possible within the scope of the appended claims. A washer can for instance be arranged between the nut 7 and the ring 6 in the embodiment according to FIG. 1 and the washer 17 according to FIG. 3 may be provided with a portion having a radial flange which engages an end surface of the element 14 in correspondence with the surfaces 11 and 12, respectively in FIG. 2. It is also possible that the locking ring is pressed into a groove in the element being arranged in a bore in the other element, whereby the other element is provided with a threaded portion adjacent the bore and with a nut externally provided with corresponding threads for obtaining a pressing up of the ring into the groove. It is not necessary that the surface 5 only is tapered but it is also possible that the surface 9 or even both surfaces 5 and 9 are tapered. It is of course also possible to use instead of tapered surfaces 5 and/or 9 surfaces having another form, for instance being part spherical or being curved in another manner.

I claim:

1. A device for locking male and female elements (1,2) against axial displacement relative to one another, said male element engageable in a bore of said female element and having a first section and a second section (8) of reduced cross-section connected by a first annular surface (5), means defining an annular groove (4) in the bore of said female element, an elastically deformable locking ring (6) mounted on the second section, a displaceable member moveable relative to the first section of said male element having a second surface (9) confronting said first surface and engageable with said locking ring, at least one of the first and second surfaces being tapered, said surfaces upon movement toward one another affecting radial outward displacement of said locking ring to engage in said annular groove, the annular space between the bore of said female element and the reduced second section of said male element being of greater cross-section than the cross-section of said locking ring so that the O-ring and male element may be moved in either direction in the bore of said female element when the O-ring is seated on said second section.

2. A device as claimed in claim 1 wherein said second section (8) is threaded and wherein said displaceable member is in the form of an internally threaded nut mounted on said threaded second section.

3. A device as claimed in claim 1 wherein said first and second surfaces are tapered and diverge radially outwardly in opposite directions.

4. A device as claimed in claim 1 wherein said displaceable member consists of a screw (18) engageable in a threaded bore in the second section of said male member.

5. A device as claimed in claim 1 wherein said displaceable member consists of a washer (17) which is displaceable by means of a screw (18).

6. A device as claimed in claim 1 wherein said displaceable member includes a radial surface (11) adapted to contact a radial surface (12) on said female element.

7. A device as claimed in claim 1 wherein said first section of said male element includes a spline (3) engageable in an axially extending groove in the outer peripheral surface of the first section of said male element.

* * * * *